(12) United States Patent
Izaki

(10) Patent No.: US 9,921,100 B2
(45) Date of Patent: *Mar. 20, 2018

(54) PHOTOMETRIC DEVICE

(71) Applicant: TOPCON TECHNOHOUSE CORPORATION, Tokyo (JP)

(72) Inventor: Yuzo Izaki, Itabashi-ku (JP)

(73) Assignee: TOPCON TECHNOHOUSE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,501

(22) Filed: May 18, 2017

(65) Prior Publication Data

US 2017/0336251 A1    Nov. 23, 2017

(30) Foreign Application Priority Data

May 19, 2016   (JP) ................................. 2016-100887

(51) Int. Cl.
| | |
|---|---|
| *G01N 21/25* | (2006.01) |
| *G01J 1/04* | (2006.01) |
| *G01J 1/44* | (2006.01) |
| *G01J 3/02* | (2006.01) |
| *G01J 3/28* | (2006.01) |
| *G01J 1/42* | (2006.01) |

(52) U.S. Cl.
CPC .............. *G01J 1/0437* (2013.01); *G01J 1/44* (2013.01); *G01J 3/0229* (2013.01); *G01J 3/2803* (2013.01); *G01J 2001/4247* (2013.01)

(58) Field of Classification Search
CPC .......... G01J 1/0437; G01J 1/44; G01J 3/0229; G01J 3/2803; G01J 2001/4247

USPC ........................................................ 356/405
See application file for complete search history.

(56) References Cited

U.S. PATENT DOCUMENTS

| | | | |
|---|---|---|---|
| 5,432,609 A | 7/1995 | Sugiyama et al. | |
| 7,365,850 B2 | 4/2008 | Imura | |
| 2006/0132781 A1 | 6/2006 | Imura | |
| 2010/0046076 A1* | 2/2010 | Feke ...................... | G02B 5/285 |
| | | | 359/578 |
| 2016/0278637 A1* | 9/2016 | Gao ......................... | A61B 3/14 |

FOREIGN PATENT DOCUMENTS

| | | |
|---|---|---|
| JP | 06-201472 | 7/1994 |
| JP | 2006-177812 | 7/2006 |

* cited by examiner

*Primary Examiner* — Hina F Ayub
(74) *Attorney, Agent, or Firm* — Chiesa Shahinian & Giantomasi PC

(57) ABSTRACT

A photometric device (1) measuring light emitted from a measuring object such as a display (2) includes two types of filters including interference filters (20X, 20Y, and 20Z) and an LVF (21), a disk (22) supporting the interference filters and the LVF, a motor (23) rotatably drive the disk to cause the light emitted from the measuring object to scan the interference filters and the LVF sequentially, a photoreceptor (13) converting light passed through the interference filters and light passed through the LVF to an electrical signal, a photometric controller (14) outputting photometric information based on the electrical signal of the light passed through the interference filters and converted by the photoreceptor and the electrical signal of the light passed through the LVF and converted by the photoreceptor.

5 Claims, 4 Drawing Sheets

PHOTOMETRIC DEVICE

CROSS-REFERENCE TO RELATED APPLICATION

This application is related to Japanese Patent Application No. 2016-100887 filed on May 19, 2016, the entire disclosure of which is incorporated by reference herein.

BACKGROUND

The present disclosure relates to a photometric device measuring luminance, chromaticity, spectral distribution, etc. of light emitted from a measuring object.

In recent years, photometric devices have been used in various fields such as industrial, food, and medical areas: measuring display characteristics of a liquid crystal display, or a state of coating on a product such as an automobile; measuring freshness of foods; and measuring health conditions of humans and animals.

Photometric devices adopt various methods for measurement of light. Examples of the methods include using filters. For example, a photometric device with multiple filters is known. The photometric device of this type includes optical filters (interference filters) corresponding to the tristimulus values to measure light emitted from a measuring object (see Japanese Unexamined Patent Publication No. H6-201472).

A photometric device with a transmissive wavelength variable filter (also called a scanning wedge band pass filter or a linear variable filter) having transmitting portions each corresponding to a different transmissive wavelength is also developed to implement measurement (see Japanese Unexamined Patent Publication No. 2006-177812).

The technique of Japanese Unexamined Patent Publication No. H6-201472 adopts the X, Y, and Z filters adjusted to but not completely conformed to the color matching functions. Thus, the measurement speed is fast, but the measurement accuracy is low.

On the other hand, the technique of Japanese Unexamined Patent Publication No. 2006-177812 adopts the transmissive wavelength variable filter to scan the one filter to obtain spectral characteristics in a necessary wavelength range. However, the transmissive wavelength variable filter splits light for every wavelength by plane split. Thus, the amount of light into a photoreceptor is very small, and low luminance (black luminance) cannot be measured. That is, this method is unsuitable for measurement of light of a liquid crystal display where evaluation of black luminance is important.

As such, Japanese Unexamined Patent Publication No. H6-201472 and Japanese Unexamined Patent Publication No. 2006-177812 disclose the methods each having both the merit and the demerit, and it is not easy for a photometric device to make measurement of light from low luminance to high luminance with high accuracy in short time.

In view of the foregoing, it is an object of the present disclosure to provide a photometric device that can make measurement of light from low luminance to high luminance with high accuracy in short time.

SUMMARY

To achieve the object, a photometric device measuring light emitted from a measuring object of an embodiment of the present disclosure includes two or more types of filters, a supporter supporting the filters, an actuator driving the supporter to cause the light emitted from the measuring object to scan the filters sequentially under a condition depending on the types of the filters, a photoreceptor converting light passed through the filters to an electrical signal, and a photometric controller outputting photometric information based on the electrical signal of the light passed through the filters and converted by the photoreceptor.

The above-described device of the embodiment of the present disclosure includes two or more different types of filters supported on a supporter, and an actuator driving the supporter to make the filters scanned sequentially under a condition depending on the types of the filters. That is, the different filters can be used in combination to complement the demerits of the filters. Accordingly, it is possible to make measurement of light from low luminance to high luminance with high accuracy in short time.

DETAILED DESCRIPTION

One embodiment of the present disclosure will be described below with reference to the drawings.

Figure 1:
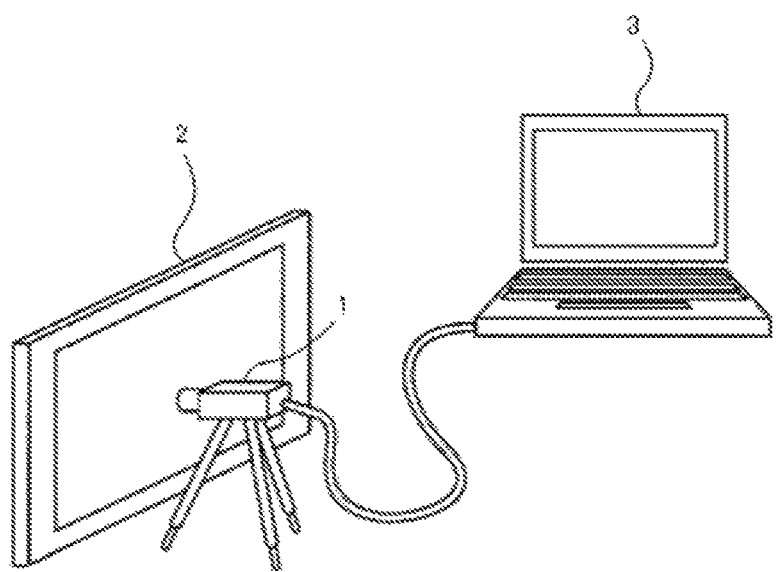
FIG. 1 is an illustration of a photometric device of one embodiment of the present disclosure applied to measurement of light of a display.

A photometric device 1 of this embodiment is a so-called plane spectroradiometer (also called a two-dimensional spectroradiometer), which can measure luminous flux emitted from a measuring object such as a display 2 as illustrated in, e.g., FIG. 1 and evaluate luminance and chromaticity of the display 2. The photometric device 1 is connectable to an external device such as a personal computer 3 (hereinafter referred to as the PC 3), and capable of outputting measurement results to the PC 3 and changing its measuring conditions via the PC 3.

Note that the measuring object of the photometric device 1 is not limited to a display, and the photometric device 1 is applicable to various fields such as inspection or simulation of coating of a product such as an automobile, food examinations, health examinations of humans and animals, etc. The photometric device 1 may be connected with an external device other than a PC, or may be used singly.

Figure 2:
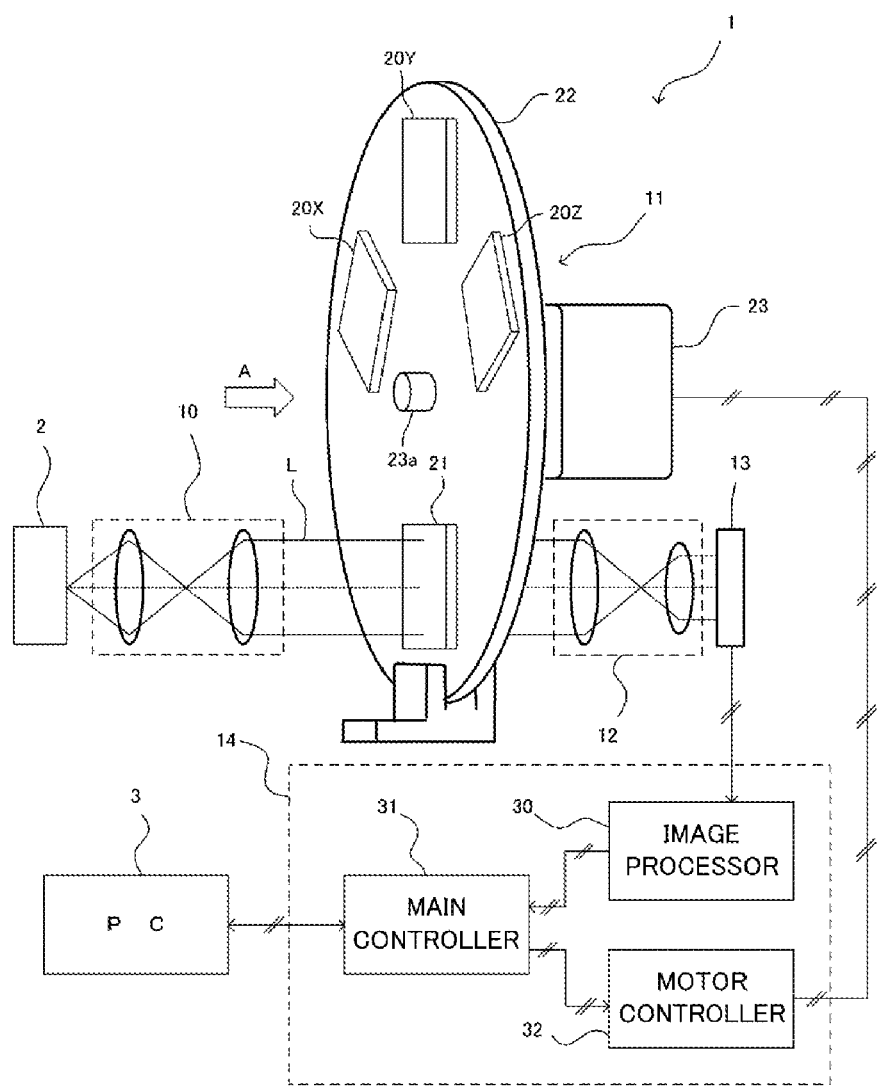
FIG. 2 is a schematic diagram showing the photometric device of one embodiment of the present disclosure.

FIG. 2 is a schematic diagram illustrating the photometric device 1. As illustrated in the figure, the photometric device 1 principally includes an objective optical system 10, a spectral unit 11, an imaging optical system 12, a photoreceptor 13 (a photoreceptor), and a photometric controller 14 (a photometric controller).

The objective optical system 10 includes a lens set collecting luminous flux La emitted from the display 2 and converting the luminous flux La to parallel luminous flux Lb directed to the spectral unit 11. The imaging optical system 12 includes a lens set collecting parallel luminous flux Lc passed through the spectral unit 11 and converting the parallel luminous flux Lc to parallel luminous flux Ld directed to the photoreceptor 13.

The spectral unit 11 includes a disk 22 (a supporter) (a plate member) provided with two different types of filters, i.e., three interference filters 20X, 20Y, and 20Z and one linear variable filter 21 (hereinafter referred to as the LVF 21) (a spectral portion). The disk 22 is a turret rotatably driven by a motor 23 (an actuator).

In detail, the interference filters 20X, 20Y, and 20Z are optical filters selectively transmitting a particular wavelength corresponding to a respective one of the tristimulus values (the color matching functions X, Y, and Z). Specifically, the three interference filters include an X filter 20X transmitting light in the Red range (R), a Y filter 20Y transmitting light in the Green range (G), and a Z filter 20Z transmitting light in the Blue range (B).

The LVF 21 has a thickness that varies along the circumferential direction of the disk 22, i.e., the width direction of the LVF 21. That is, the LVF 21 is a transmissive wavelength variable filter having different transmissive wavelengths depending on the thickness variation. For example, the LVF 21 of this embodiment has a transmissive wavelength of about 350-1100 nm.

These three interference filters 20X, 20Y, and 20Z and the one LVF 21 have rectangular shapes each having generally the same area, and are provided along the circumferential direction on the disk plane. In this embodiment, the three interference filters 20X, 20Y, and 20Z are provided closely in a region on one side of the disk 22, and the one LVF 21 is provided in a region on another side of the disk 22. Note that the layout of the interference filters 20X, 20Y, and 20Z and the LVF 21 on the disk 22 is not limited to the one described above.

The motor 23 includes a rotational shaft 23a coupled to the center of the disk 22 and capable of being rotatably driven in a direction crossing a light path of the luminous flux Lb directed to the disk 22. In this embodiment for example, the disk 22 in FIG. 2 is rotatably driven counterclockwise. The motor 23 is a stepping motor, which rotatably drives the disk 22 by an angle determined for 1 step.

This angle of rotation per 1 step is variable, and the angles of rotation of the motor 23 of this embodiment include a predetermined angle (called a first predetermined angle) per 1 step corresponding to scanning of each of the interference filters 20X, 20Y, and 20Z, a predetermined angle (called a second predetermined angle) per 1 step corresponding to scanning of the LVF 21, and a predetermined angle (called a third predetermined angle) per 1 step corresponding to movement between the interference filter 20X or 20Z and the LVF 21.

Figure 3:
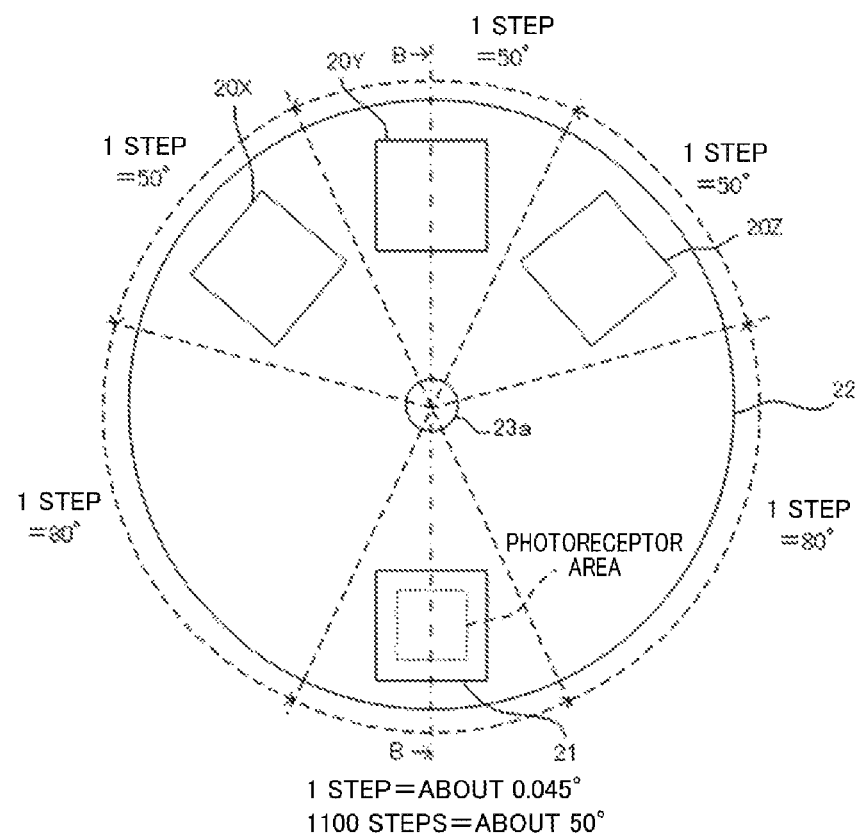
FIG. 3 is a plan view of a disk viewed from the arrow A in FIG. 2.

Specifically, as illustrated in FIG. 3, which is a plan view of the disk 22 viewed from the arrow A in FIG. 2, the interference filters 20X, 20Y, and 20Z and the LVF 21 each occupy an area having a central angle of about 50° on the disk plane. The motor 23 makes 1 step by 50° to rotate the disk 22 in the areas of the interference filters 20X, 20Y, and 20Z, and makes 1100 steps (1 step by 0.045°) to rotate the disk 22 in the area of the LVF 21. The motor 23 also makes 1 step by 80° to rotate the disk 22 from the X filter 20X to the LVF 21 and from the LVF 21 to the Z filter 20Z.

Figure 4:
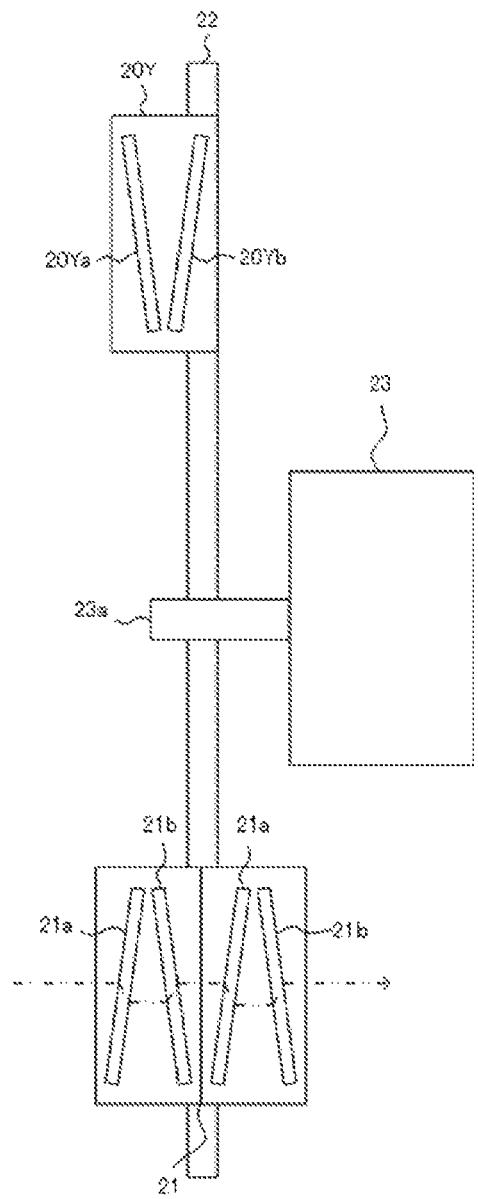
FIG. 4 is a cross-sectional view taken along the line B-B in FIG. 3.

Moreover, as illustrated in FIG. 4 showing a cross-sectional view taken along the line B-B in FIG. 3, the interference filters 20X, 20Y, and 20Z include a pair of filter elements 20Xa and 20Xb, 20Ya and 20Yb, and 20Za and 20Zb (only 20Ya and 20Yb are illustrated in the figure), respectively, each paired along the light path. The LVF 21 includes two pairs of filter elements 21a and 21b paired along the light path. The two pairs of the filter elements 21a and 21b are arranged in line along the light path. To remove stray light, the pair of filter elements 20Ya and 20Yb are tilted and faced with each other so that the disk center side (one side) of the filter element 20Ya is close to the disk center side (one side) of the filter element 20Yb and the disk outer periphery side (the other side) of the filter element 20Ya is away from the disk outer periphery side (the other side) of the filter element 20Yb. In addition, the pair of filter elements 21a and 21b are tilted and faced with each other so that the disk center side (one side) of the filter element 21a is close to the disk center side (one side) of the filter element 21b and the disk outer periphery side (the other side) of the filter element 21a is away from the disk outer periphery side (the other side) of the filter element 21b.

The photoreceptor 13 is an imaging device such as a CCD, which receives light passed through the interference filters 20X, 20Y, and 20Z and the LVF 21 and imaged by the imaging optical system 12 and converts the resultant image to an electrical signal. The photoreceptor 13 is electrically connected with the photometric controller 14 and outputs the converted electrical signal to the photometric controller 14.

The photometric controller 14 principally includes an image processor 30, a main controller 31, and a motor controller 32, and the electrical signal converted by the photoreceptor 13 is entered into the image processor 30. The image processor 30 implements predetermined signal processing such as conversion of the entered electrical signal from an analog signal to a digital signal, and outputs the processed information to the main controller 31.

The main controller 31 implements predetermined computing of information (hereinafter referred to as the XYZ data) of the light passed through the interference filters 20X, 20Y, and 20Z and information (hereinafter referred to as the spectral data) of the light passed through the LVF 21. This predetermined computing includes, e.g., use of the XYZ data for self-calibration of light information of the LVF. Specifically, the spectral data is used to complement measurement accuracy of the XYZ data.

In addition, the predetermined computing includes, e.g., output of a measurement result to the PC 3 connected with the photometric device 1, corrections of wavelengths, temperatures, linearity, etc.

The main controller 31 is also connected with the motor controller 32, e.g., to determine the rotatable drive conditions of the motor 23. Then, the motor controller 32 makes the disk 22 rotatably driven under the predetermined rotatable drive conditions specifying the angles per 1 step, the number of steps, etc. as described above.

It will be now described how the photometric device 1 configured as described above operates during measurement of light.

For implementing measurement with the photometric device 1, the objective optical system 10 of the photometric device 1 is provided toward the display 2 as a measuring object, as illustrated in FIG. 1. The photometric device 1 is connected with various external devices such as the PC 3.

When the photometric device 1 receives a trigger for start of measurement of light in response to operation of a switch (not shown) or the PC 3, the motor 23 rotatably drives the disk 22 by the predetermined angles and in the predetermined number of steps under control of the motor controller 32.

With the disk 22 rotated, the luminous flux Lb passed through the objective optical system 10 scans the interference filters 20X, 20Y, and 20Z and the LVF 21 sequentially. The entirety of each of the interference filters 20X, 20Y, and 20Z is quickly scanned in 1 step. In contrast, the LVF 21 is scanned in each of the fragmented wavelength ranges, i.e., scanned in a narrow angle by a large number of steps. That is, the LVF 21 takes longer time for scanning than the interference filters 20X, 20Y, and 20Z.

The interference filters 20X, 20Y, and 20Z and the LVF 21 include the pairs of filter elements 20Xa and 20Xb, 20Ya and 20Yb, 20Za and 20Zb, and 21a and 21b, respectively. Thus, as illustrated in FIG. 4 showing luminous flux passing through the LVF 21 by the two-dot chain line, the luminous flux Lb is incident on and temporarily refracted outward by the front filter element 21a, and then incident on and refracted inward by the back filter element 21b. Accordingly, the luminous flux Lb returns to the line of the original light path. Such refraction of the luminous flux can reduce stray light of the luminous flux of the measuring object.

After transmitted from the interference filters 20X, 20Y, and 20Z and the LVF 21, the luminous flux Lc is imaged on the photoreceptor 13 by the imaging optical system 12. Then, the resultant image is converted to an electrical signal by the photoreceptor 13, and the electrical signal is output to the photometric controller 14.

In the photometric controller 14, the entered electrical signal is transferred from the image processor 30 to the main controller 31 as the XYZ data and the spectral data, the transferred data is processed for self-calibration, etc., in the main controller 31, and the processed data as measurement result information is output to the PC 3.

As described above, the photometric device 1 of this embodiment includes the spectral unit 11 including the disk 22 integrally supporting the interference filters 20X, 20Y, and 20Z selectively transmitting incident light and the LVF 21 separating the incident light, and the interference filters 20X, 20Y, and 20Z and the LVF 21 are scanned sequentially by operation of the motor 23. Thus, both the XYZ data and the spectral data can be obtained through the sequential operation. Then, in the photometric controller 14, the self-calibration processing is implemented based on the XYZ data and the spectral data. Thus, the spectral data lacking the amount of light can be complemented by the XYZ data.

The photometric device 1 includes combination of the different types of filters including the interference filters 20X, 20Y, and 20Z (not spectral portions) selectively transmitting light and the LVF 21 (a spectral portion). Thus, the photometric device 1 can make measurement with accuracy provided by the LVF 21, and also can complement low-luminance measurement with the interference filters 20X, 20Y, and 20Z. Accordingly, the photometric device 1 can make measurement of light from low luminance to high luminance with high accuracy in a short time.

The spectral unit 11 includes the interference filters 20X, 20Y, and 20Z and the LVF 21, which are provided on the disk plane along the circumferential direction thereof and can be scanned sequentially by operation of the disk 22 rotatably driven by the motor 23. Thus, the interference filters 20X, 20Y, and 20Z and the LVF 21 can be scanned by the simple configuration and the easy driving control.

Further, the LVF 21 is used as a spectral portion, and thus the light can be separated with the simple configuration. In addition, the interference filters include the three interference filters 20X, 20Y, and 20Z, which have the Red range, the Green range, and the Blue range, respectively. Thus, the spectral data can be complemented with a minimum of the interference filters.

The description of the embodiment of the present disclosure has been now completed, but the aspects of the present disclosure are not limited to the embodiment.

The photometric device 1 of the above-described embodiment includes the one motor 23, which has the angle per 1 step variable to adjust the scanning time of each of the filters. However, adjustment of scanning time of the filters is not limited to such a method. For example, a plurality of motors each having a different speed may be used, or a variable speed gear may be engaged to make the rotatable drive conditions variable.

The photometric device 1 of the embodiment includes the two types of filters including the interference filters 20X, 20Y, and 20Z and the LVF 21, but may include different filters.

The photometric device 1 of the embodiment includes the disk 22, which supports the interference filters 20X, 20Y, and 20Z and the LVF 21 and produces the circular motion for scanning. However, the supporter for the filters is not limited to the disk. For example, the supporter may be a rectangular plate (a plate member) provided with the interference filters and the LVF in the longitudinal direction of the rectangular plate so that the rectangular plate linearly moves along this longitudinal direction to implement scanning.

What is claimed is:

1. A photometric device measuring light emitted from a measuring object, the photometric device comprising:
   two or more types of filters;
   a supporter supporting the filters;
   an actuator variably driving the supporter at a speed depending on the types of the filters to cause the light emitted from the measuring object to scan the filters sequentially under a condition depending on the types of the filters;
   a photoreceptor converting light passed through the filters to an electrical signal; and
   a photometric controller outputting photometric information based on the electrical signal of the light passed through the filters and converted by the photoreceptor.

2. The photometric device of claim 1, wherein the supporter is a plate member provided with at least one interference filter, which is one of the two or more types of filters, and at least one spectral portion, which is another one of the two or more types of filters on a plane of the plate member, and
   the actuator is a motor moving the plate member along a direction in which the interference filter and the spectral portion are provided, and variably driving the plate member so that the spectral portion takes a longer time for scanning than the interference filters.

3. The photometric device of claim 2, wherein the spectral portion includes a linear variable filter having transmitting portions of light each corresponding to a different transmissive wavelength.

4. The photometric device of claim 2, wherein the interference filters include three interference filters, having a Red range, a Green range, and a Blue range, respectively, and selectively transmitting a particular wavelength corresponding to a respective one of tristimulus values.

5. The photometric device of claim 2, wherein the interference filter and the spectral portion each include a pair of filter elements paired along a light path, and the pair of filter elements are tilted and faced with each other so that one side of one of the pair of filter elements is close to one side of the other one of the pair of filter elements, and the other side of one of the pair of filter elements is away from the other side of the other one of the pair of filter elements.

* * * * *